United States Patent
Yonat

(10) Patent No.: US 8,042,105 B1
(45) Date of Patent: Oct. 18, 2011

(54) MULTIPLE CONFIGURABLE CUSTOMIZATION LAYER SYSTEM, METHOD AND COMPUTER PROGRAM PRODUCT

(75) Inventor: Ram Yonat, Tel-Mond (IL)

(73) Assignee: Amdocs Software Systems Limited, Dublin (IE)

( * ) Notice: Subject to any disclaimer, the term of this patent is extended or adjusted under 35 U.S.C. 154(b) by 1403 days.

(21) Appl. No.: 11/521,128

(22) Filed: Sep. 13, 2006

(51) Int. Cl.
*G06F 9/45* (2006.01)
(52) U.S. Cl. ........................................ 717/168
(58) Field of Classification Search .................... 717/168
See application file for complete search history.

(56) References Cited

U.S. PATENT DOCUMENTS

| | | | |
|---|---|---|---|
| 6,192,255 B1* | 2/2001 | Lewis et al. ................... | 455/558 |
| 7,325,015 B2* | 1/2008 | Zhou et al. ........................... | 1/1 |
| 7,546,314 B1* | 6/2009 | Lakner et al. ......................... | 1/1 |
| 2002/0154555 A1 | 10/2002 | Krueger et al. ................ | 365/200 |
| 2003/0221184 A1 | 11/2003 | Gunjal et al. ................. | 717/118 |
| 2004/0111424 A1* | 6/2004 | Roman et al. ................. | 707/100 |
| 2007/0162892 A1* | 7/2007 | Zenz et al. .................... | 717/121 |

OTHER PUBLICATIONS

"Sentai Software" http://www.findaccountingsoftware.com/software/developer/579.
"How to Write Software Just Once" DevX Home, http://archive.devx.com/webdev/article/mc100101/mc100101-1.asp.

* cited by examiner

*Primary Examiner* — John Chavis
(74) *Attorney, Agent, or Firm* — Zilka-Kotab, PC

(57) ABSTRACT

A system, method and computer program product are provided for customizing a core program. In use, a core program is provided. In addition, a plurality of configurable customization layers are provided, each for customizing at least one aspect of the core program or one of the configurable customization layers.

23 Claims, 5 Drawing Sheets ated, the system 300 may be carried
MULTIPLE CONFIGURABLE CUSTOMIZATION LAYER SYSTEM, METHOD AND COMPUTER PROGRAM PRODUCT

FIELD OF THE INVENTION

The present invention relates to program customization, and more particularly to customizing various aspects of a program.

BACKGROUND

Programs are customized for a variety of purposes. Just by way of example, a core product may be customized to meet the needs of a particular customer, to update an aspect to suit a specific environment, etc. Traditional systems typically only employ a single layer of customization to facilitate the foregoing customization. Specifically, by including such single customization layer, any particular aspect of the core product may be customized for any one of a variety of reasons.

Despite the benefits associated with such single customization layer, some drawbacks exist. For example, when a common code is developed in the customization layer and a customer needs to customize the same, such customer account may replicate the common code and apply customizations to such code. If, however, changes are later made to the common customization code, they have to be reapplied to each customer account that customized it.

There is thus a need for overcoming these and/or other problems associated with the prior art.

SUMMARY

A system, method and computer program product are provided for customizing a core program. In use, a core program is provided. In addition, a plurality of configurable customization layers are provided, each for customizing at least one aspect of the core program or one of the configurable customization layers.

DETAILED DESCRIPTION

Figure 1:
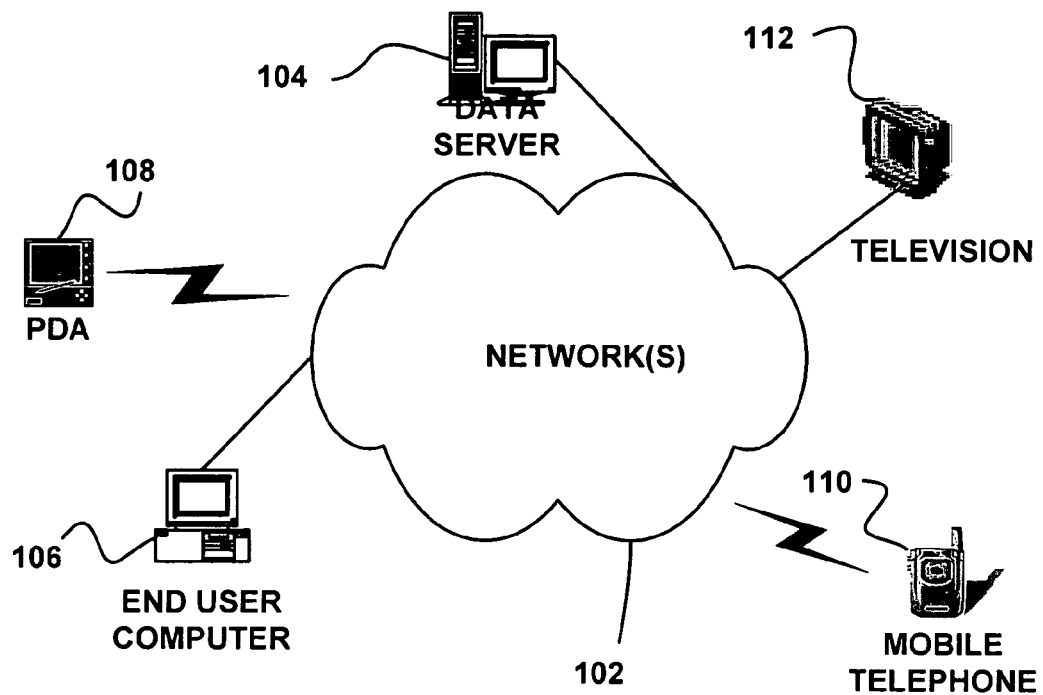
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
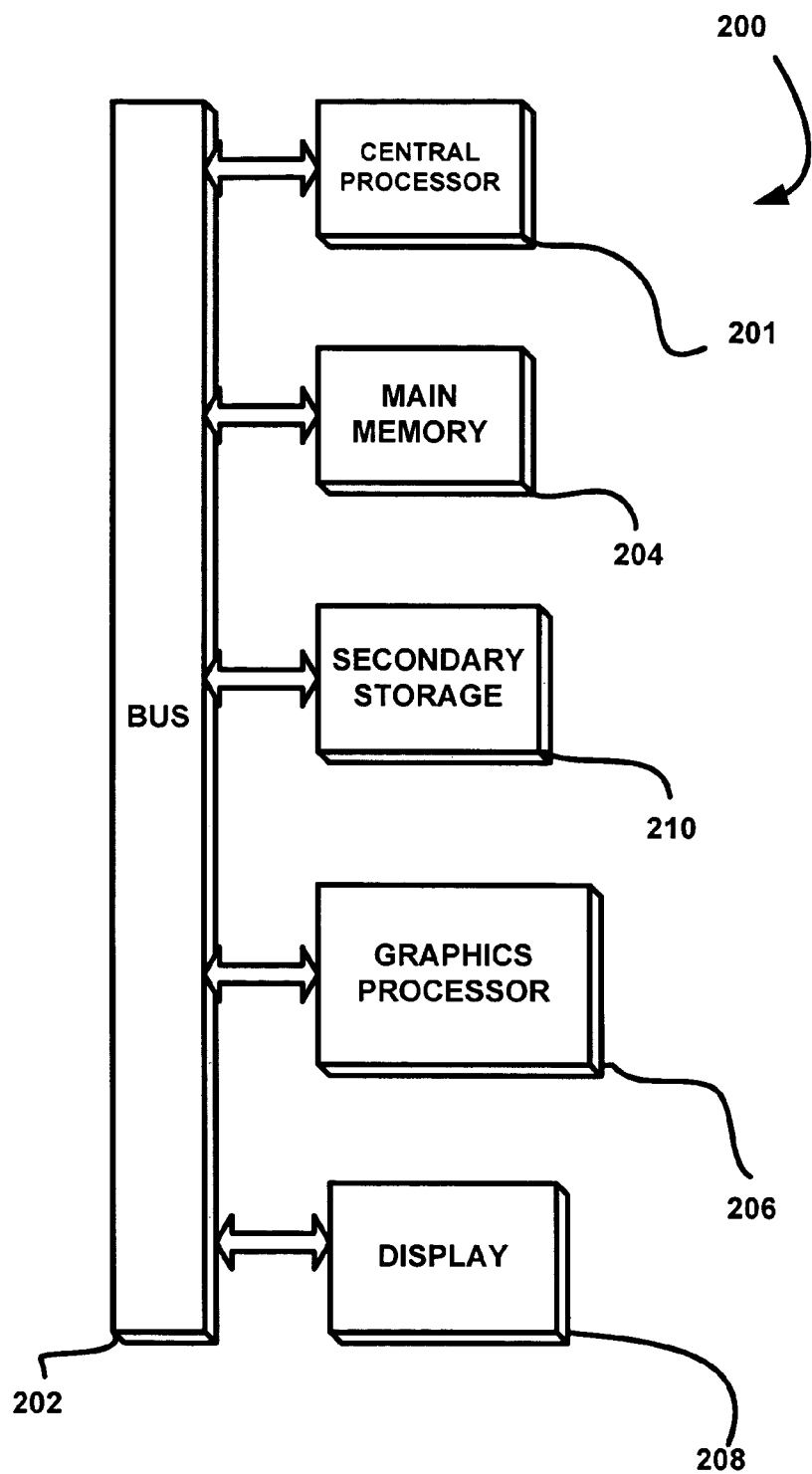
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
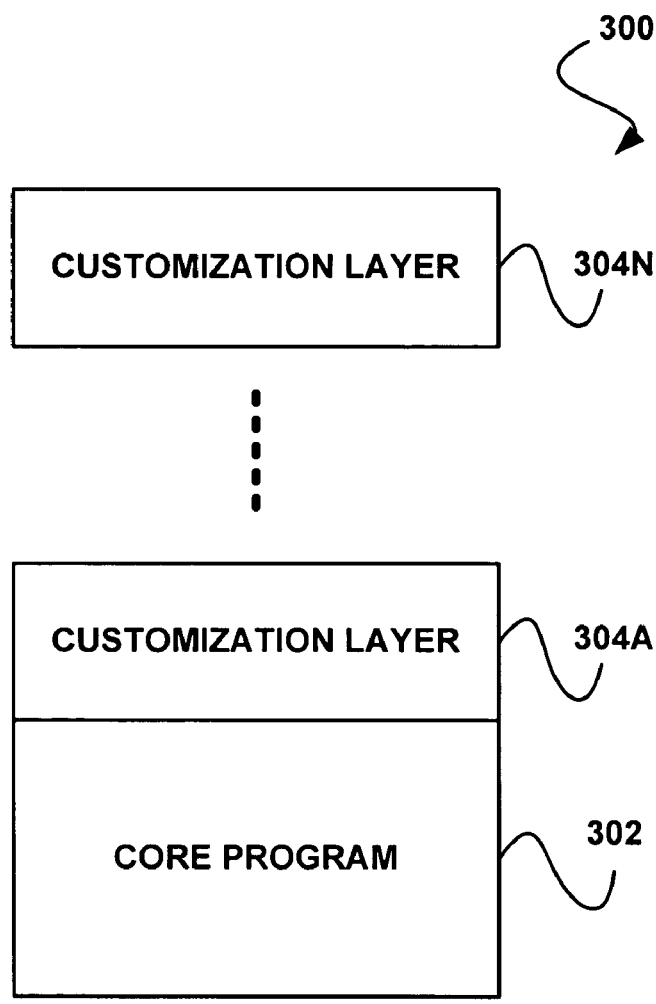
FIG. 3 shows a system for customizing a core product, in accordance with one embodiment.

FIG. 3 shows a system 300 for customizing a core product, in accordance with one embodiment. As an option, the system 300 may be implemented in the context of the details of FIGS. 1 and/or 2. Of course, however, the system 300 may be carried out in any desired environment. Further, the aforementioned definitions may equally apply to the description below.

As shown, a core program 302 is included. The core program may include an application program, system program, and/or any other program. In addition, the core program may include a generic program manufactured and distributed to a plurality of users or a specialized program manufactured specifically for a particular user.

Further, the core program may include any type of program (e.g. security, billing, etc.) capable of being executed on a computer. For example, the core program may be capable of being executed on any of the devices described above with respect to FIGS. 1 and/or 2. Of course, however, the core program may be capable of being executed on any desired type of device.

Moreover, a plurality of configurable customization layers 304A-N are included for customizing at least one aspect of the core program 302 or one of the configurable customization layers 304A-N. Specifically, the configurable customization layers 304A-N may include program layers capable of updating the core program 302. As another option, the configurable customization layers 304A-N may include program layers capable of updating at least one configurable customization layer 304A-N already applied to the core program 302. Such updating may include, for example, customizing and/or modifying the core program 302 and/or pre-existing configurable customization layers 304A-N.

In addition, in one embodiment, the configurable customization layers 304A-N may be positioned on top of the core program 302. The configurable customization layers 304A-N may be placed on top of the core program 302 by packaging configurable customization layers 304A-N already positioned on the core program. One example of such packaging will be described in more detail with respect to FIG. 5. Of course, it should be noted that the configurable customization layers 304A-N may be placed on top of the core program 302 in any desired manner.

For example, in an optional embodiment, the customization layers 304A-N and the core program 302 may be configured as a stack. For example, the customization layers 304A-N may serve to provide higher-level functionality. Put another way, the core program 302 may function without the customization layers 304A-N.

The configurable customization layers 304A-N may be configured according to the needs and/or desires of at least one user of the core program 302. The configurable customization layers 304A-N may also be configured by users of the core program 302. As will be described below, the configurable customization layers 304A-N may be configured generically and/or specifically for updating the core program 302.

The configurable customization layers 304A-N may update the core program 302 in any number of various ways. Just by way of example, the configurable customization layers 304A-N may customize an extension of a data model of the core program 302, may introduce a new data model, or may include an extension of an application program interface (API) exposed by the core program 302. Of course, the API may also be exposed by another configurable customization layer 304A-N positioned on top of the core program 302 and/or below yet another configurable customization layer 304A-N.

Further, in some embodiments, the configurable customization layers 304A-N may include an introduction of an API. Furthermore, the configurable customization layers 304A-N may declare (e.g. define, etc.) an exit point (e.g. hook, etc.). The exit point may be utilized by another configurable customization layer 304A-N to be placed on top of the configurable customization layer 304A-N that declares the exit point.

Such other configurable customization layer 304A-N that utilizes the exit point may be directly placed on top of the configurable customization layer 304A-N that declares the exit point or may be placed more than one layer above such configurable customization layer 304A-N. Thus, the exit point may be exposed by a configurable customization layer 304A-N that is positioned on top of another configurable customization layer 304A-N and/or that is positioned below another configurable customization layer 304A-N.

Additionally, the exit point may be capable of being customized by only a subset of the configurable customization layers 304A-N. Specifically, the implementation may include opening and/or blocking the exit point for customization by a next configurable customization layer 304A-N. Just by way of example, an exit point that is blocked by a configurable customization layer 304A-N may not be utilized by subsequently applied configurable customization layers 304A-N, in the context of one optional embodiment. Of course, it should be noted, however, that the configurable customization layers 304A-N may perform any desired functions for updating the core program and any existing configurable customization layers 304A-N.

In one embodiment, at least one of the configurable customization layers 304A-N may include a generic customization layer. The generic customization layer may be capable of being reused by a plurality of users (e.g. customization personnel, etc.). For example, the generic customization layer may be utilized by a plurality of users of a core program 302 to update the core program or the generic customization layer. Moreover, if N−1 configurable customization layers 304A-N are applied to a core program 302, then the N−1 configurable customization layers 304A-N may be considered a generic customization layer to the Nth subsequent configurable customization layers 304A-N.

Further, the generic customization layer may optionally be utilized with a generic core program. Of course, however, the generic customization layer may optionally be utilized with any desired core program 302. The generic customization layer may also be positioned on top of the core program 302, or in the case of a core program 302 with configurable customization layers 304A-N already applied, may be applied to any preceding configurable customization layers 304A-N.

In another embodiment, the configurable customization layers 304A-N may include at least one specific customization layer. The specific customization layer may optionally include a customization layer that is specific to a particular user of the core program 302. For example, the specific customization layer may be created to accommodate the particular needs of a single user of the core program 302.

As an option, the specific customization layer may be positioned on top of the generic customization layer. Thus, the specific customization layer may further update a core program 302 from a generic update already applied to the core program utilizing a generic customization layer. As another option, the specific customization layer may be positioned directly on top of the core program 302.

Accordingly, the configurable customization layers 304A-N may be utilized for customizing at least one aspect of the core program 302 or may be utilized for customizing one of the configurable customization layers 304A-N already positioned on top of the core program 302. It should be noted that any desired number (e.g. 2, 3, 4, 5, 10, 50 or more, etc.) of configurable customization layers 304A-N may be utilized for updating the core program 302. In this way, updates to the core program 302 may be provided between long product releases of the core product 302, thus more efficiently supplying updates to the core program 302.

In addition, the core product may be customized 302 for particular users in a way that would not necessarily be provided by the core product 302 itself. Furthermore, utilizing the configurable customization layers 304A-N, customizations made to the core product 302 may be maintained regardless of whether further updates are made.

More illustrative information will now be set forth regarding various optional architectures and uses in which the foregoing system 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
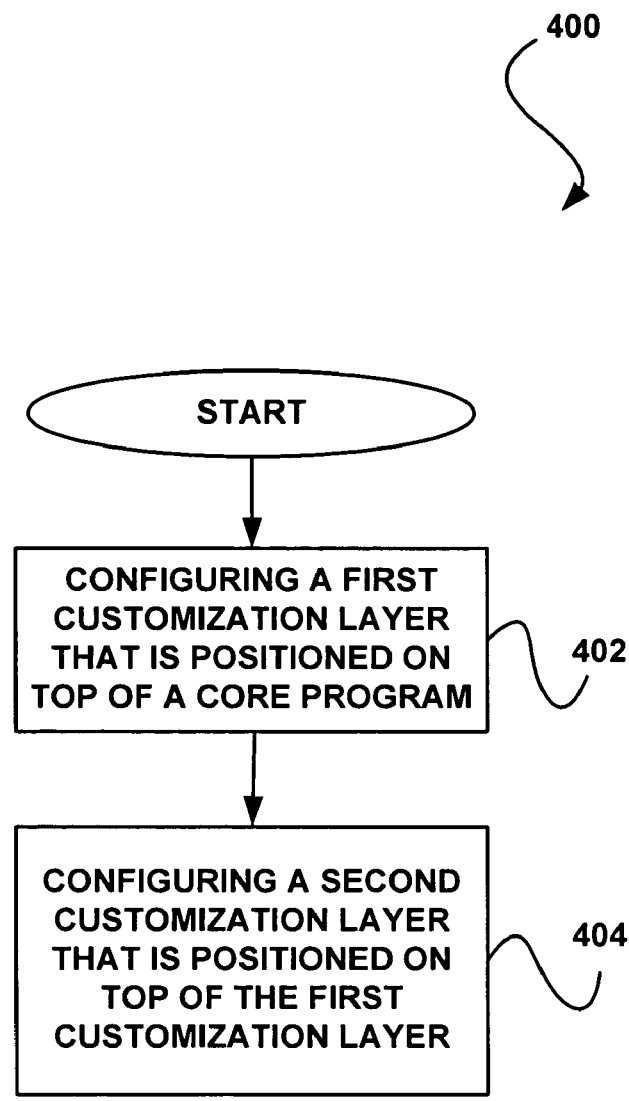
FIG. 4 shows a method for customizing a core product utilizing multiple customization layers, in accordance with another embodiment.

FIG. 4 shows a method 400 for customizing a core product utilizing multiple customization layers, in accordance with another embodiment. As an option, the method 400 may be implemented in the context of the details of FIGS. 1-3. Of course, however, the method 400 may be carried out in any desired environment. Again, the aforementioned definitions may equally apply to the description below.

As shown in operation 402, a first customization layer that is positioned on top of a core program is configured. Thus, the first customization layer may include a layer capable of being placed on top of the core program and capable functioning with the core program. As an option, the first customization layer may include an extension layer that is capable of being configured by a user of the core program.

In other embodiments, the first customization layer may include a generic customization layer. The first customization layer may also provide any desired type of functionality to be utilized by the core program. The first customization layer may be user-configured prior to placing the customization layer on top of the core program, but of course may also be user-configured after being placed on top of the core program.

The first customization layer may be positioned on top of the core program by placing an exit point in the core program that is associated with the first customization layer. The core program may therefore utilize the functionality of the first customization layer by way of the exit point. Of course, however, the core program may utilize the first customization layer in any desired manner.

Furthermore, a second customization layer that is positioned on top of the first customization layer may be configured, as shown in operation 404. Thus, the second customization layer may be capable of being placed on top of the first customization layer and therefore on top of the core program. In this way, the second customization layer may be capable of functioning with the core program and/or the first customization layer.

In addition, the second customization layer may include an extension layer that is capable of being configured by a user of the core program. As with the first customization layer, the second customization may include a generic customization layer or a specific customization layer, in other embodiments. The second customization layer may also provide any desired type of functionality to be utilized by the core program and/or the first customization layer.

The second customization layer may be positioned on top of the first customization layer by placing an exit point in the first customization layer and/or core program that is associated with the second customization layer. The first customization layer and/or core program may therefore utilize the functionality of the second customization layer by way of the exit point. Of course, however, the first customization layer may utilize the second customization layer in any desired manner. In this way, extensions of functionality may be provided to the core program utilizing customization layers.

Figure 5:
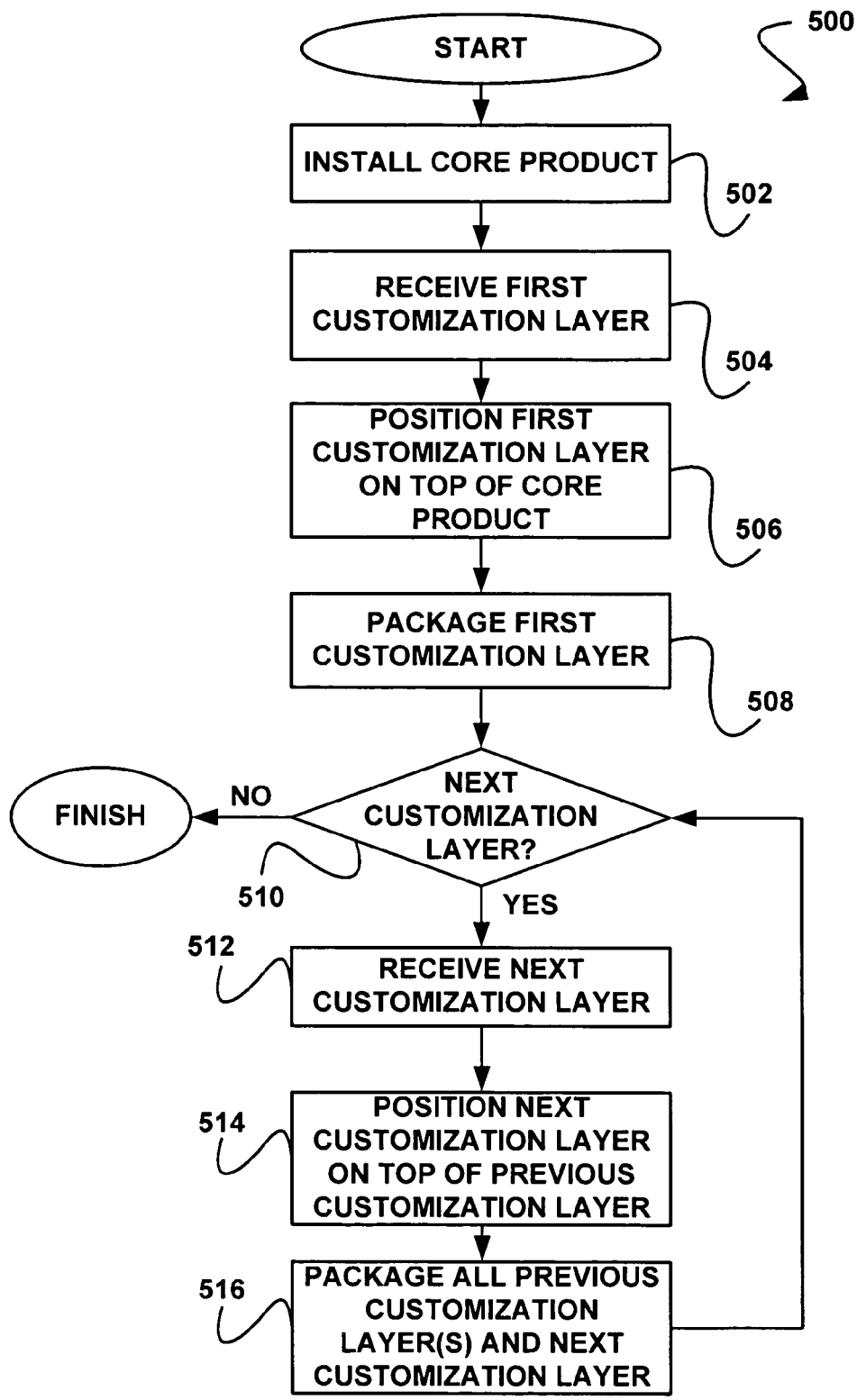
FIG. 5 shows a method for repackaging a core product with customization layers for adding additional customization layers to the core product, in accordance with yet another embodiment.

FIG. 5 shows a method 500 for repackaging a core product with customization layers for adding additional customization layers to the core product, in accordance with yet another embodiment. As an option, the method 500 may be implemented in the context of the details of FIGS. 1-4. Of course, however, the method 500 may be carried out in any desired environment. Again, the aforementioned definitions may equally apply to the description below.

As shown in operation 502, a core product is installed. The core product may be installed on any desired device. In addition, the core product may be installed in any desired manner (e.g. utilizing a core product embodied on a physical medium, downloading the core product from a network, etc.).

A first customization layer is then received, as shown in operation 504. The first customization layer may also be received in any manner (e.g. utilizing a physical medium, downloading from a network, etc.). The first customization layer may be received for customizing at least a portion of the core product. Thus, the first customization layer may be received at any time after the installation of the of the core product.

Further, the first customization layer is positioned on top of the core product, as shown in operation 506. Thus, the first customization layer may be a layer to the core product. The first customization layer may then be packaged, as shown in operation 508.

The first customization layer may be packaged as a product. The package may include a software development package (SDK), for example. Thus, the first customization layer package may include APIs, programming tools, documentation, etc. In addition, javadocs and/or doxygen may be utilized for generating documentation for such package.

The first customization layer package may be provided such that further customizations may be made to the package. Such further customizations may be made utilizing additional customization layers. In particular, an additional customization layer may be applied to the first customization layer package, as described below.

It may then be determined whether a next customization layer is to be applied to a previous customization layer in order to customize the core product and/or any previous customization layer, as shown in decision 510. If it is determined that a next customization layer is to be applied, the next customization layer is received for reasons described below, as shown in operation 512.

The next customization layer is positioned on top of the previous customization layer, as shown in operation 514. The packaging of previous customization layers results in such previous customization layers being represented as a core layer to the next customization layer. In this way, any next customization layers may be applied directly to a single package of all previous customization layers.

Once a next customization layer is positioned on top of a previous customization layer, all previous customization layer(s) and the next customization layer may be packaged. Note operation 516. As an option, such next customization layer may wrap an SDK associated with the previous customization layer(s). Accordingly, a single SDK that includes all previous customization layers and such next customization layer may be presented to a subsequent customization layer. Furthermore, treating each customization layer as a separate package may allow such customization layer to be associated with its own timeline such that subsequent customization layers are not necessarily reliant on any of the previous customization layers.

Additional customization layers may therefore be created and received as desired to further customize a core product and any customization layers already applied to such core product. Moreover, each additional customization layer may be applied to a single package of previously applied customization layers.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
  a processor for:
    executing a core program, the core program is a functional program prior to customization and exposes an application program interface; and
    executing a plurality of configurable customization layers each for customizing at least one aspect of the core program or one of the configurable customization layers, the customizing of the at least one aspect including an exit point capable of being customized by only a subset of the configurable customization layers.

2. The system of claim 1, wherein at least one of the configurable customization layers includes a generic customization layer.

3. The system of claim 2, wherein the generic customization layer is capable of being reused by a plurality of customization personnel.

4. The system of claim 2, wherein at least one of the configurable customization layers includes a specific customization layer.

5. The system of claim 4, wherein the specific customization layer is positioned on top of the generic customization layer.

6. The system of claim 4, wherein the specific customization layer is capable of being used by a single user.

7. The system of claim 1, wherein the at least one aspect includes an extension of a data model of the core program.

8. The system of claim 1, wherein the at least one aspect includes an introduction of a data model.

9. The system of claim 1, wherein the at least one aspect includes an extension of the application program interface.

10. The system of claim 9, wherein the application program interface is exposed by at least one of the configurable customization layers that is positioned below another one of the configurable customization layers.

11. The system of claim 1, wherein the exit point is exposed by at least one of the configurable customization layers that is positioned on top of another one of the configurable customization layers.

12. The system of claim 1, wherein the exit point is exposed by at least one of the configurable customization layers that is positioned below another one of the configurable customization layers.

13. The system of claim 1, wherein customization of the exit point by at least one of the configurable customization layers is blocked.

14. The system of claim 1, wherein at least one of the configurable customization layers that is positioned below another one of the configurable customization layers appears as a core layer to the other configurable customization layer.

15. The system of claim 1, wherein the core program includes a billing program.

16. The system of claim 1, wherein the configurable customization layers are placed on top of the core program by packaging at least one of the configurable customization layers already positioned on the core program.

17. The system of claim 1, wherein the customization layers and the core program are configured as a stack.

18. The system of claim 1, wherein the exit point includes a hook.

19. The system of claim 1, wherein the exit point is utilized by one of the configurable customization layers that is positioned on top of another one of the configurable customization layers declaring the exit point.

20. The system of claim 1, wherein a first configurable customization layer is positioned on top of the core program by placing the exit point in the core program.

21. The system of claim 20, wherein the core program utilizes the functionality of the first configurable customization layer by way of the exit point.

22. A computer program product embodied on a non transitory computer readable medium, comprising:
    a core program, the core program is a functional program prior to customization and exposes an application program interface; and
    a plurality of configurable customization computer code segments each for customizing at least one aspect of the core program or one of the configurable customization computer code segments, the customizing of the at least one aspect including an exit point capable of being customized by only a subset of the configurable customization computer code segments.

23. A method, comprising:
    configuring a first customization layer that is positioned on top of a core program the core program is a functional program prior to configuring the first customization layer and exposes an application program interface; and
    configuring, utilizing a processor, a second customization layer that is positioned on top of the first customization layer;
    wherein the configuring of the customization layers includes an exit point capable of being configured by only a subset of the configurable customization layers.

* * * * *

UNITED STATES PATENT AND TRADEMARK OFFICE
CERTIFICATE OF CORRECTION

| | | |
|---|---|---|
| PATENT NO. | : 8,042,105 B1 | |
| APPLICATION NO. | : 11/521128 | |
| DATED | : October 18, 2011 | |
| INVENTOR(S) | : Ram Yonat | |

It is certified that error appears in the above-identified patent and that said Letters Patent is hereby corrected as shown below:

In the claims:
Claim 23, col. 8, line 33; please replace "program" with --program,--. Second occurrence Signed and Sealed this
Thirty-first Day of January, 2012

David J. Kappos
*Director of the United States Patent and Trademark Office*